(12) United States Patent
Baca et al.

(10) Patent No.: US 9,435,953 B2
(45) Date of Patent: Sep. 6, 2016

(54) OPTICAL FIBER CABLE WITH CORE ELEMENT HAVING SURFACE-DEPOSITED COLOR LAYER

(71) Applicant: Corning Optical Communications LLC, Hickory, NC (US)

(72) Inventors: Adra Smith Baca, Rochester, NY (US); Dana Craig Bookbinder, Corning, NY (US); Timothy Leonard Hunt, Wilmington, NC (US); Michael Anthony Lockee, Connelly Springs, NC (US); Eric John Mozdy, Horseheads, NY (US)

(73) Assignee: CORNING OPTICAL COMMUNICATIONS LLC, Hickory ( * ) Notice: Subject to any disclaimer, the term of this patent is extended or adjusted under 35 U.S.C. 154(b) by 5 days.

(21) Appl. No.: 14/574,938

(22) Filed: Dec. 18, 2014

(65) Prior Publication Data

US 2015/0153511 A1    Jun. 4, 2015

Related U.S. Application Data

(62) Division of application No. 14/206,278, filed on Mar. 12, 2014, now Pat. No. 8,923,675.

(60) Provisional application No. 61/881,697, filed on Sep. 24, 2013.

(51) Int. Cl.
*G02B 6/44* (2006.01)
*G02B 6/24* (2006.01)

(52) U.S. Cl.
CPC ............... *G02B 6/24* (2013.01); *G02B 6/441* (2013.01); *G02B 6/4482* (2013.01); *G02B 6/443* (2013.01); *Y10T 29/49826* (2015.01)

(58) Field of Classification Search
CPC .. G02B 6/4494; G02B 6/443; G02B 6/4433; G02B 6/4403; G02B 6/4475; G02B 6/4471; G02B 6/4495; G02B 6/44
USPC ............... 385/100, 102, 106, 109, 112
See application file for complete search history.

(56) References Cited

U.S. PATENT DOCUMENTS

| 2,106,048 | A | 1/1938 | Candy, Jr. |
| 3,076,235 | A | 2/1963 | Rollins et al. |

(Continued)

FOREIGN PATENT DOCUMENTS

| CN | 202196211 U | 4/2012 |
| CN | 202256824 U | 5/2012 |

(Continued)

OTHER PUBLICATIONS

Patent Cooperation Treaty, International Search Report, PCT/US2014/056063, Mail date Jan. 5, 2015, 9 pages.

(Continued)

*Primary Examiner* — Jennifer Doan
(74) *Attorney, Agent, or Firm* — William D. Doyle (57) ABSTRACT

A method of forming an optical communication cable is provided. The cable includes a core element located in a cable jacket. The core element includes a buffer tube having an outer surface, an inner surface and a channel defined by the inner surface of the first tube. The core element includes an optical fiber located within the channel of the buffer tube and a color layer formed from a surface-deposited colorant material applied to the outer surface of the buffer tube.

9 Claims, 3 Drawing Sheets

(56) References Cited

U.S. PATENT DOCUMENTS

| | | | |
|---|---|---|---|
| 4,629,285 A | 12/1986 | Carter et al. | |
| 6,236,789 B1 | 5/2001 | Fitz | |
| 6,326,551 B1 | 12/2001 | Adams | |
| 6,363,192 B1 * | 3/2002 | Spooner | G02B 6/4416 174/115 |
| 6,459,837 B1 | 10/2002 | Fitz et al. | |
| 6,560,390 B2 | 5/2003 | Grulick et al. | |
| 6,825,418 B1 | 11/2004 | Dollins et al. | |
| 7,269,318 B2 | 9/2007 | Cook | |
| 8,145,027 B2 | 3/2012 | Overton et al. | |
| 8,175,434 B2 | 5/2012 | Davidson et al. | |
| 2003/0012530 A1 | 1/2003 | Yamasaki et al. | |
| 2003/0108311 A1 | 6/2003 | Ma | |
| 2011/0025468 A1 | 2/2011 | Longhurst et al. | |
| 2013/0000942 A1 | 1/2013 | Dollins et al. | |

FOREIGN PATENT DOCUMENTS

| | | |
|---|---|---|
| DE | 19928506 A1 | 9/2000 |
| EP | 2275849 A2 | 1/2011 |
| JP | 4130403 | 5/1992 |
| JP | 11125753 | 5/1999 |
| WO | WO 03/007043 A1 | 1/2003 |

OTHER PUBLICATIONS

Aqueous Processes for Dyeing Generic, Unmodified Polypropylene Fiber, Journal of Engineered fibers and Fabrics, vol. 5, Issue 2—2010, 13 pages.

Effect of chemical oxidation treatment on dyeability of polypropylene, Ali R. Tehrani B. et al., Science Direct Dyes and Pigments 63 (2004) 95-100, Jul. 12, 2003, 6 pages.

Surface Dyeing of Polypropylene Fibres, P. Deanko et al., Vlakna a textile (4) 2010, 6 pages, undated, aware of at least by Sep. 5, 2013.

Various Approaches for Dyeing of Polypropylene, V. Halbe, Sarvajanik College of Engg. & Tech., Surat., 8 pages, undated, aware of at least by Sep. 5, 2013.

* cited by examiner

OPTICAL FIBER CABLE WITH CORE ELEMENT HAVING SURFACE-DEPOSITED COLOR LAYER

RELATED APPLICATIONS

This Application is a divisional application of pending U.S. patent application Ser. No. 14/206,278, filed on Mar. 12, 2014, which claims the benefit of U.S. Provisional Application No. 61/881,697, filed on Sep. 24, 2013, the content of each of which is incorporated by reference herein in their entirety.

BACKGROUND

The disclosure relates generally to optical communication cables and more particularly to optical communication cables including core elements each with a color layer of a surface-deposited colorant material to color identify core elements within the cable. Optical communication cables have seen increased use in a wide variety of electronics and telecommunications fields. Optical communication cables contain or surround one or more optical communication fibers. The cable provides structure and protection for the optical fibers within the cable.

SUMMARY

One embodiment of the disclosure relates to an optical communication cable. The optical communication cable includes a cable body including a channel within the cable body and a first core element located in the channel of the cable body. The first core element includes a first tube having an outer surface, an inner surface and a channel defined by the inner surface of the first tube. The first tube is formed from a material having a base color. The first core element includes an optical fiber located within the channel of the first tube and an area of a surface-deposited first colorant material deposited on the outer surface of the first tube. The first colorant material has a first color. The cable also includes a second core element located in the channel of the cable body. The second core element includes a second tube having an outer surface, an inner surface and a channel defined by the inner surface of the second tube. The second tube is formed from the material having the base color. The second core element includes an optical fiber located within the channel of the second tube and an area of a surface-deposited second colorant material deposited on the outer surface of the second tube. The second colorant material has a second color. The base color is different from the first color and from the second color, and the first color is different from the second color.

An additional embodiment of the disclosure relates to an optical communication cable including a cable jacket having a channel extending through the cable jacket. The cable includes a core element located in the channel of the cable jacket. The core element includes a buffer tube having an outer surface, an inner surface and a channel defined by the inner surface of the first tube. The core element includes an optical fiber located within the channel of the buffer tube and a color layer formed from a surface-deposited colorant material applied to the outer surface of the buffer tube. The color layer includes a first edge extending in an axial direction along the outer surface of the buffer tube, a second edge extending in the axial direction along the outer surface of the buffer tube, and a width between the first edge and the second edge. The color layer has a depth, and the density of the surface-deposited colorant material within the color layer decreases as the distance from the outer surface of the buffer tube increases. The width of the color layer is constant over an axial distance of at least 5 mm.

An additional embodiment of the disclosure relates to a method of forming an optical cable. The method includes providing an extruded and cooled first buffer tube surrounding an optical fiber, and the first buffer tube is formed from a material having a first color. The method includes depositing a first colorant material to the outer surface of the extruded and cooled first buffer tube forming a colored area on the outer surface of the first buffer tube that extends axially along the outer surface of the first buffer tube. The first colorant material has a second color. The method includes providing an extruded and cooled second buffer tube surrounding an optical fiber, and the second buffer tube is formed from the material having the first color. The method includes depositing a second colorant material to the outer surface of the extruded and cooled second buffer tube forming a colored area on the outer surface of the second buffer tube that extends axially along the outer surface of the second buffer tube. The second colorant material has a third color. The method includes coupling the first buffer tube and the second buffer tube together after the first colorant material is deposited and after the second colorant material is deposited.

In at least one embodiment, colorant and/or ultraviolet light blocking materials may be surface deposited on a cable jacket that is primarily formed from a base material that is free of the colorants and/or ultraviolet light blocking material. Such a cable jacket may be used in combination with the optical fibers and core elements disclosed herein.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical communication cable (e.g., a fiber optic cable, an optical fiber cable, etc.) are shown. In general, the cable embodiments disclosed herein include one or more optical fiber containing core elements. In various embodiments, the optical fiber containing core elements include a tube (e.g., a buffer tube) surrounding one or more optical transmission element located within the tube. In the embodiments disclosed herein each tube includes a surface-deposited area of colorant material that identifies a particular buffer tube within the cable. The colorant material extends along the length of the buffer tube to allow a user to properly identify a particular tube along the length of the cable. In addition, the colorant material of each buffer tube includes a color that is distinct and distinguishable from the color of the surface-deposited area of colorant material of the buffer tubes of the other core elements within the cable. Thus, the distinguishable difference in color assists a user (e.g., an installer, repairer, etc.) to distinguish different core elements within the cable.

In various embodiments discussed herein, each buffer tube of each core element is formed from the same base material having the same base color as the buffer tubes of the other core elements within the cable. Thus, in these embodiments, it is the different colors of the different surface-deposited colorant materials that distinguish core elements from each other within the cable. In such embodiments, the base color of each tube is a neutral color that provides a consistent reference as well as enhanced contrast relative to the colors of the different surface-deposited colorant layers of each core element. Thus, in contrast to the color identification scheme in which the entire buffer tube of the core element is colored using a colored extruded plastic, in various embodiments, buffer tubes of the of the present disclosure include a reference base or background color improving the ability to discern the unique identifying color on the tube. This reference and enhanced contrast may be particularly helpful in the low-light conditions sometimes common in fiber optic installation locations.

In various embodiments, the surface-deposited colorant material is applied to the outer surface of the tube of each core element after the tube is extruded and cooled around one more optical fiber, such as following a period of time (e.g., more than an hour, more than a day, more than a week, etc.) before the identifying color layer is applied to the outer surface of the buffer tube. In such embodiments, the surface-applied color layer is applied prior to coupling of multiple core elements together (e.g., stranding core elements around a central strength member in an SZ pattern) and prior to jacket extrusion. Thus, the cable embodiments, discussed herein provides for the production of core elements having buffer tubes each formed from the same base material having the same base color. The surface-deposited color layers of the present disclosure may allow for more efficient use of colorant material because the colorant material is applied to the outer surface (or upper most portions) of the buffer tube allowing a large percentage of colorant material to contribute to detection by the user. This is in contrast to coloration schemes that utilize an extruded, pre-colored plastic material to form the buffer tube in which the colored plastic material extends the entire thickness of the buffer tube, because in such arrangements the buffer tube may include significant amounts of colorant material that are within the buffer tube and therefore are not viewable by the user. In some embodiments, the surface-deposited colorant may be applied before the tube is fully cooled relative to room temperature (e.g., 25 degrees C.) and/or before the tube is fully solidified (e.g., still tacky), and/or after the tube is re-heated to above room temperature (e.g., at least 50 degrees C.) and/or at least partially tacky, which may help improve diffusion of the colorant and/or bonding of ink.

Figures 1, 2, 3:
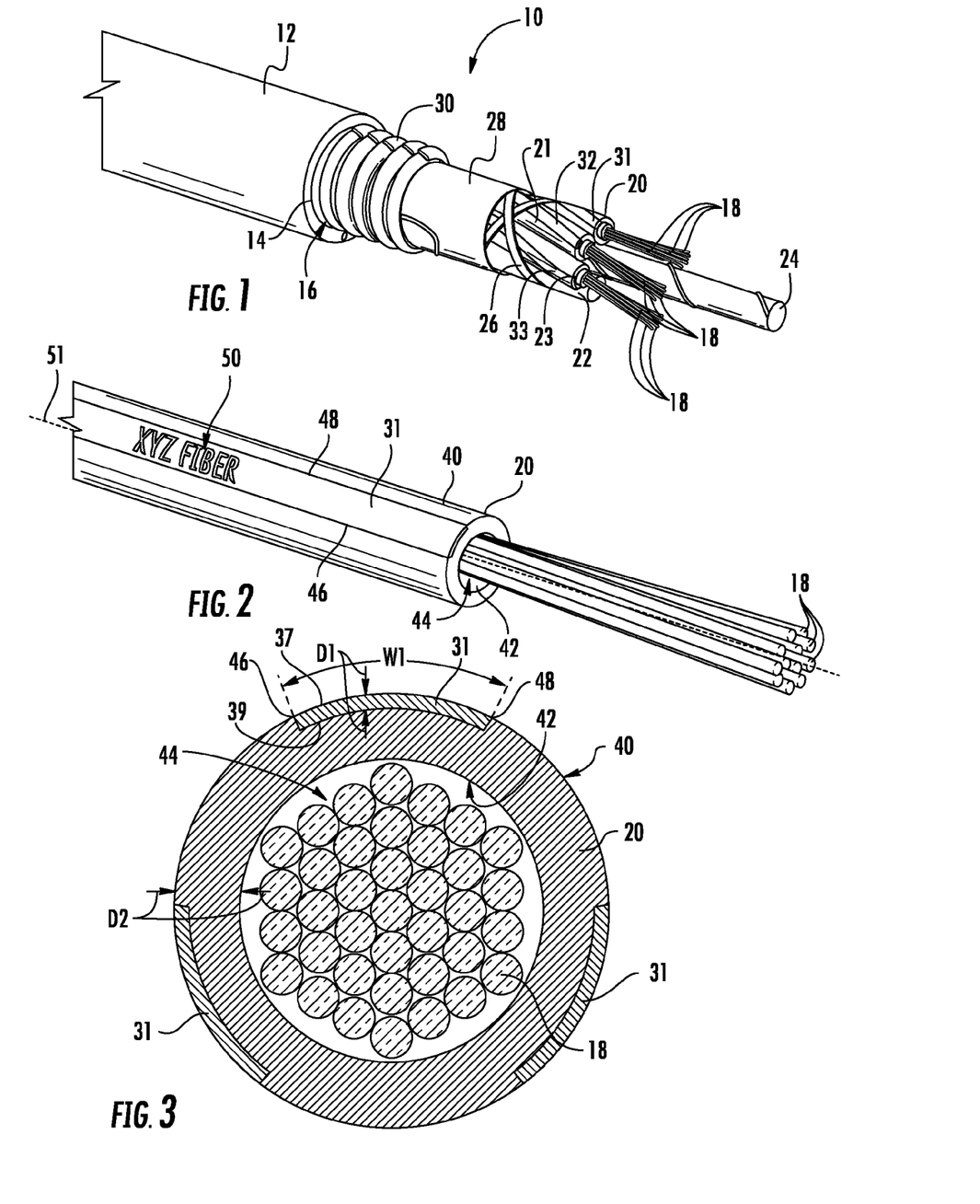
FIG. 1 is a perspective view of an optical fiber cable according to an exemplary embodiment.
FIG. 2 is a detailed perspective view of a core element of the cable of FIG. 1 according to an exemplary embodiment.
FIG. 3 is a cross-sectional view of the core element of FIG. 2 according to an exemplary embodiment.

Referring to FIG. 1, an optical communication cable, shown as cable 10, is shown according to an exemplary embodiment. Cable 10 includes a cable body, shown as cable jacket 12, having an inner surface 14 that defines a channel, shown as central bore 16. A plurality of optical transmission elements, shown as optical fibers 18, is located within bore 16. Generally, cable 10 provides structure and protection to optical fibers 18 during and after installation (e.g., protection during handling, protection from elements, protection from vermin, etc.).

In the embodiment shown in FIG. 1, cable 10 includes a plurality of core elements located within central bore 16. A first type of core element is an optical transmission core element, and these core elements include bundles of optical fibers 18 that are located within tubes, shown as first buffer tube 20, second buffer tube 21 and third buffer tube 23. One or more additional core elements, shown as filler rods 22, may also be located within bore 16. Filler rods 22 and buffer tubes 20, 21 and 23 are arranged around a central support, shown as central strength member 24 formed from a material such as glass-reinforced plastic or metal (e.g., steel). In the embodiment shown, filler rods 22 and buffer tubes 20, 21 and 23 are shown in a helical stranding pattern, such as an SZ stranding pattern. Helically wound binders 26 are wrapped around buffer tubes 20, 21 and 23 and filler rods 22 to hold these elements in position around support rod 24. A barrier material, such as water barrier 28, is located around the wrapped buffer tubes 20 and filler rods 22.

A reinforcement sheet or layer, shown as armor layer 30, is located outside of water barrier 28. Armor layer 30 is wrapped around the interior elements (including optical fibers 18) of cable 10 such that armor layer 30 surrounds optical fibers 18. Armor layer 30 generally provides an additional layer of protection to fibers 18 within cable 10, and may provide resistance against damage (e.g., damage caused by contact or compression during installation, damage from the elements, damage from rodents, etc.).

Referring to FIG. 1, each buffer tube 20, 21 and 23 includes an area of a surface-deposited colorant material, shown as stripes 31, 32 and 33. In various embodiments, stripes 31, 32 and 33 are color layers formed from colorant material deposited onto the outer surface of buffer tubes 20, 21 and 23 respectively. In various embodiments, each of stripes 31, 32 and 33 is formed from a different colorant material each having a different color such that stripes 31, 32 and 33 may be used to identify a particular buffer tube 20, 21 and 23 within cable 10.

In various embodiments, buffer tubes 20, 21 and 23 are formed by extruding a thermoplastic material around optical fibers 18. In one embodiment, buffer tubes 20, 21 and 23 are formed from a polypropylene (PP) material or polyolefin material and/or co-polymers thereof, and in another embodiment, buffer tubes 20, 21 and 23 are formed from a polycarbonate (PC) material. In other embodiments, buffer tubes 20, 21 and 23 are formed from one or more polymer material including polybutylene terephthalate (PBT), polyamide (PA), polyoxymethylene (POM), poly(ethene-co-tetrafluoroethene) (ETFE), etc. In various embodiments, buffer tubes 20, 21 and 23 are all formed from the same type of material having the same color. Thus, in such embodiments, each of the buffer tubes has the same base color, and stripes 31, 32 and 33 are formed by a colorant material that is deposited onto the outer surface of buffer tubes. In addition, in various embodiments, buffer tubes 20, 21 and 23 may have a base color that also provides information regarding the type of fiber within each buffer tube. For example, buffer tubes 20, 21 and 23 may be formed having one base color if fibers 18 are multi-mode fibers, a different base color if fibers 18 are single mode fibers, and yet another base color if fibers 18 are bend insensitive (e.g., low bend attenuation) fibers.

In various embodiments, stripes 31, 32 and 33 are formed using an ink material or from a dye material. In various embodiments, stripes 31, 32 and 33 are formed from one or more of a variety of surface-deposition coloring processes including ink-jet application processes, liquid dye application processes, spray application processes, contact application processes etc. In various embodiments, the tube surface may be pre-treated by a variety of methods including gas plasma, electrical discharge, etc. and the ink or dye may be set or cured by a variety of methods including chemical curing, thermal curing, physical curing, etc.

In various embodiments, stripes 31, 32 and 33 are ink jet deposited ink layers. In such embodiments, charged ink particles are sprayed from an ink jet nozzle to form stripes 31, 32 and 33. In various embodiments, stripes 31, 32 and 33 are formed using solvent-based pigmented inks or UV curable pigmented inks. In other embodiments, stripes 31, 32 and 33 are may be formed using laser activated dyes.

In various embodiments, the base color of buffer tubes 20, 21 and 23 is a neutral color (e.g., white, cream, beige, etc.) that provides for a high contrast reference relative to stripes 31, 32 and 33. This high contrast reference aids the user in identifying the color of stripes 31, 32 and 33 particularly in low-light environments. In various embodiments, buffer tubes 20, 21 and 23 may be colored white by the addition of a white material (e.g., titanium dioxide) with the polymer material of the buffer tube prior to extrusion. Thus, in this embodiment, each buffer tube 20, 21 and 23 has the same base color following extrusion around the optical fibers.

In various embodiments, the high contrast between the base color of buffer tubes 20, 21 and 23 and stripes 31, 32 and 33 is described utilizing the Munsell Color System. In various embodiments, the color of buffer tubes 20, 21 and 23 has a Munsell Color System chroma number less than 2 and a Munsell Color System value number greater than 8.75. In some such embodiments, the color of buffer tubes 20, 21 and 23 is a white color, having a stripe of a Munsell Color System hue number between 5RP and 5GY or between 10YR and 10Y. In various embodiments, stripes 31, 32 and 33 are each selected from the group of colors including blue, orange, green, brown, slate, red, black, yellow, violet, rose and aqua. In various embodiments, stripes 31, 32 and 33 are each a different color from each other and different from the base color of the buffer tube. In various embodiments, stripes 31, 32 and 33 having a Munsell Color System chroma number greater than 4 and a Munsell Color System value number less than or equal to 8.

Referring to FIGS. 2 and 3, a core element, such as buffer tube 20 and fibers 18, are shown according to an exemplary embodiment. It should be understood that the other core elements, including buffer tubes 21 and 23 (FIG. 1), can include a color layer or area as described herein. Buffer tube 20 includes an outer surface 40 that defines the exterior surface of the buffer tube and an inner surface 42 that defines channel, shown as central bore 44. Optical fibers 18 are located within central bore 44. In various embodiments, optical fibers 18 may be loosely packed within buffer tube 20 (e.g., a "loose buffer"), and in other embodiments, optical fibers 18 may be held in place within buffer tube 20 via a matrix material (e.g., a "tight buffer"). In various embodiments, central bore 44 may include additional materials, including water blocking materials, such as water swellable gels. In some embodiments, optical fibers 18 may be supported within a ribbon.

In various embodiments, stripe 31 is positioned and shaped on outer surface 40 to provide clear viewing of stripe 31 from multiple angles. As shown, stripe 31 includes a first lateral edge 46 and a second lateral edge 48. Lateral edges 46 and 48 define the transition from the color of stripe 31 to the color of outer surface 40. In the embodiment shown, stripe 31 extends in the axial direction of buffer tube 20 such that stripe is substantially parallel to longitudinal axis 51 of buffer tube 20.

In one embodiment, stripe 31 extends, uninterrupted, at least a portion of the axial length of buffer tube 20. In one embodiment, stripe 31 extends, uninterrupted, for at least 5 mm along outer surface 40. In one embodiment, stripe 31 extends, uninterrupted, for at least 50 cm along outer surface 40. In one embodiment, stripe 31 extends, uninterrupted, for at least 1 m along outer surface 40. In one embodiment, stripe 31 extends, uninterrupted, along the entire length of buffer tube 20.

In the embodiment shown in FIGS. 2 and 3, edges 46 and 48 are parallel to each other, and stripe 31 has circumferential dimension, or width, show as W1, which is the circumferential dimension of stripe 31 measured perpendicular to edges 46 and 48. In various embodiments, W1 accounts for between 40 degrees and 70 degrees of the circumference of outer surface 40, specifically between 45 degrees and 65 degrees of the circumference of outer surface 40 and more specifically between 50 degrees and 60 degrees of the circumference of outer surface 40. In a specific embodiment, W1 accounts for 55 degrees plus or minus 1 degree of the circumference of outer surface 40. The uniform depth and distinct boundaries of the stripes 31 in FIG. 3 may not accurately portray the infusion of dye, which may vary as a function of depth into the base material, having a greater concentration near the surface and lacking a distinct, straight boundary interior thereto. Further, in some embodiments, the surface-deposited material and/or indicia may extend above (e.g., project from, such as by at least 5 micrometers on average) the outer surface of the underlying material (e.g., base material), such as ink deposited on the surface, and may not extend much if at all into the base material (e.g., less than 5 micrometers on average).

In various embodiments, buffer tube 20 includes more than one stripe 31 positioned at even intervals around the circumference of buffer tube 20. In a specific embodiment as shown in FIG. 3, buffer tube 20 includes three stripes 31 positioned such that the circumferential center point of each stripe 31 is about 120 degrees for the adjacent stripes. Thus, this arrangement in conjunction with the relative width W1 of each stripe helps to ensure that one of the stripes 31 will be viewable upon opening of cable jacket 12.

In various embodiments, the colorant material of stripe 31 extends a portion of the distance into the material of buffer tube 20 from outer surface 40 to inner surface 42. In this embodiment, stripe 31 has a maximum radial dimension or a depth shown schematically as D1. In one embodiment, the depth of stripe 31 is substantially constant at all circumferential positions of stripe 31, and in other embodiments, the depth of stripe 31 varies at different circumferential positions.

In various embodiments, buffer tube 20 has a maximum radial dimension or thickness, shown as D2, and D1 is such that stripe 31 has sufficient wear resistance properties while also maintaining an efficient use of surface-deposited colorant materials. In one embodiment, D1 is between 0.1% and 10% of D2, specifically is between 1% and 10% of D2, and more specifically is between 1.5% and 3.5% of D2. In various embodiments, D1 is between 1 micrometer and 20 micrometers, specifically is between 5 micrometers and 15 micrometers, and more specifically is about 10 micrometers (e.g., 10 micrometers plus or minus one micrometer). In such embodiments, D2 may be between 200 micrometers and 600 micrometers, and more specifically between 300 micrometers and 500 micrometers.

In various embodiments and in contrast to co-extruded colored plastics, the surface-deposited color areas discussed herein do not extend through the entire thickness, D2, of the buffer tube. Further, in one embodiment, the density of the colorant material within the surface-deposited color layer, such as stripe 31, decreases through the depth of the stripe 31 as the distance from outer surface 40 increases. Thus, in such embodiments, referring to FIG. 3, the density of colorant material near the outer portion 37 of stripe 31 is greater than the density of colorant material near the inner portion 39 of stripe 31.

Referring to FIG. 2, in addition to the color-based identification provided by stripe 31, buffer tube 20 may also include identification indicia, shown as a first alphanumeric indicia 50, that is indicative of a property of buffer tube 20 and/or fibers 18 (e.g., brand, size, fiber type, manufacturer etc.) located within buffer tube 20. In various embodiments, indicia 50 is located within stripe 31 such that indicia 50 is located between edges 46 and 48. In such embodiments, indicia 50 is formed from a surface-deposited colorant material that is a different color than the color of stripe 31. In one such embodiment, indicia 50 is formed from a surface-deposited colorant material that is the same color as the base color of buffer tube 20, and in another embodiment, indicia 50 is formed from a surface-deposited colorant material having a color that is different from the color of buffer tube 20. Indicia 50 may be formed from any of the formation processes used to form stripe 31 discussed herein.

Figure 4:
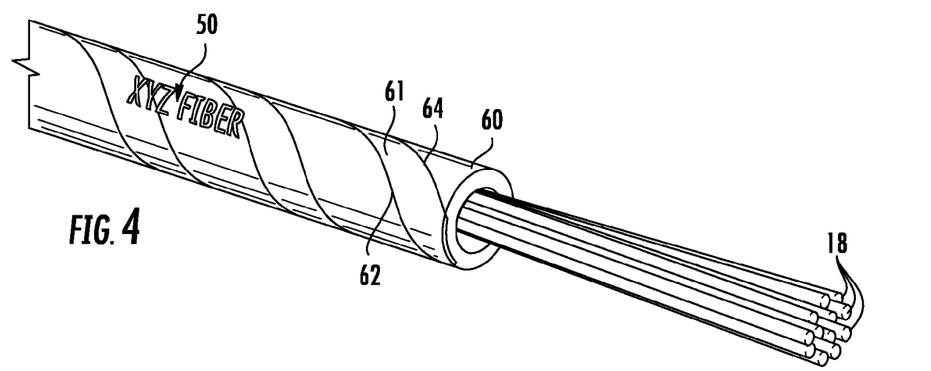
FIG. 4 is a detailed perspective view of a core element according to another exemplary embodiment.

Referring to FIG. 4, a core element, such as buffer tube 60 and fibers 18, is shown according to an exemplary embodiment. Buffer tube 60 is substantially the same as buffer tube 20 discussed above, except that buffer tube 60 includes a helical stripe 61 instead of stripe 31. As shown, helical stripe 61 extends in both the axial direction and in the circumferential direction along the outer surface of buffer tube 60. Because helical stripe 61 winds around the outer surface of buffer tube 60, at least a portion of helical stripe 61 will tend to be viewable from all angular positions relative to the circumference of buffer tube 60. This arrangement helps to ensure that stripe 61 will be viewable upon opening of cable jacket 12, and the stripe 61 has a different color than the buffer tube 60 base material. The stripe may be helical in one direction, or may be reverse-oscillatory.

In various embodiments, helical stripe 61 is sized so that it's viewable during typical fiber optic core access situations (e.g., during cable mid-span access, cable end access, etc.). Thus, in one embodiment, helical stripe 61 is sized and shaped such that it makes a full revolution around cable jacket (i.e., the pitch length of the helix) in less than 1 m. In various embodiments, the pitch length of helical stripe 61 is between 0.1 m and 1 m. In other embodiments, the pitch length of helical stripe 61 is less than 15 cm. In various embodiments, the pitch length of helical stripe 61 is between 1 cm and 15 cm.

In various embodiments, the pitch length of helical stripe 61 may be greater in the middle portions of buffer tube 60 than at the ends of buffer tube 60. In one such embodiment, the portions of helical stripe 61 within than 1 m of the ends of the buffer tube 60 has a pitch length between 1 cm and 15 cm. In some such embodiments, the pitch length of helical stripe 61 is between 0.1 m and 1 m toward the middle of buffer tube 60 (e.g., more than 1 m away from either end of the buffer tube).

In the embodiment shown, buffer tube 60 includes indicia 50 formed on the outer surface of buffer tube 60. In this embodiment, indicia 50 traverses lateral edges 62 and 64 of stripe 61 such that portions of indicia 50 are located within stripe 61 and other portions of indicia 50 are located on buffer tube 60 outside of stripe 61. In such embodiments, the color of indicia 50 is different from both the color of stripe 61 and the base color of buffer tube 60. By providing alternating contrasting colors adjacent to indicia 50, indicia 50 may be easier to detect and view by the user.

Figure 5:
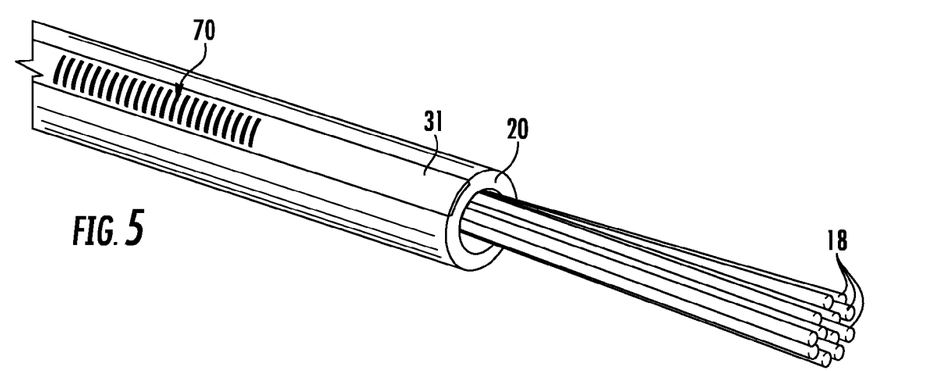
FIG. 5 is a detailed perspective view of a core element according to another exemplary embodiment.

Referring to FIG. 5, buffer tube 20 is shown according to another embodiment. In this embodiment buffer tube 20 includes identification indicia, shown as machine readable indicia 70, in place of or in addition to indicia 50 discussed above. Indicia 70 may be colored and formed similar to indicia 50 discussed above. In various embodiments, indicia 70 may be a bar code, QR code or other machine readable indicia that may be scanned or otherwise read by a device to help the user identify a particular core element within a cable.

Figure 6:
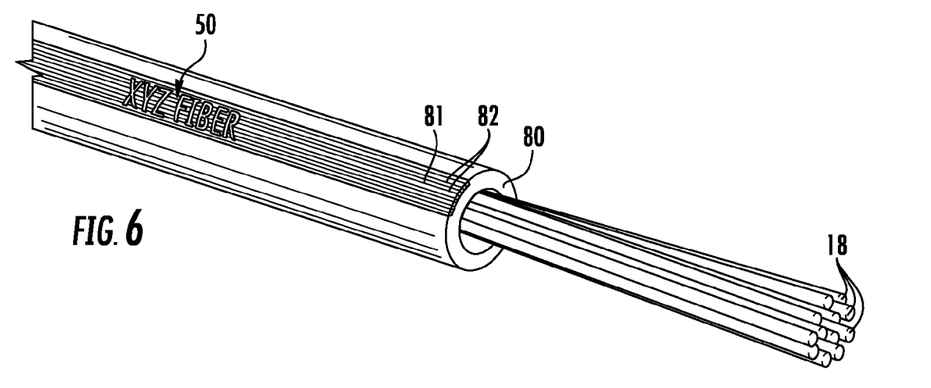
FIG. 6 is a detailed perspective view of a core element according to another exemplary embodiment.

Referring to FIG. 6, a core element, such as buffer tube 80 and fibers 18, is shown according to an exemplary embodiment. Buffer tube 80 is substantially the same as buffer tube 20 discussed above. However, buffer tube 80 includes a stripe 81 instead of stripe 31. In contrast to the solid stripe 31 shown in FIG. 2, stripe 81 is formed from a series of axially extending sub-stripes 82. In this embodiment, stripe 81 is formed from a series of parallel sub-stripes 82 formed from a surface-deposited colorant material. In such embodiments, sections of buffer tube 20 without surface-deposited colorant are located between the sub-stripes 82. In various embodiments, sub-stripes 82 may increase the contrast and readability of indicia 50. Sub-stripes 82 may have a different color than the base material of the buffer tube 80, and differences between the colors may match the quantified differences described herein in terms of the Munsell scale.

Figure 7:
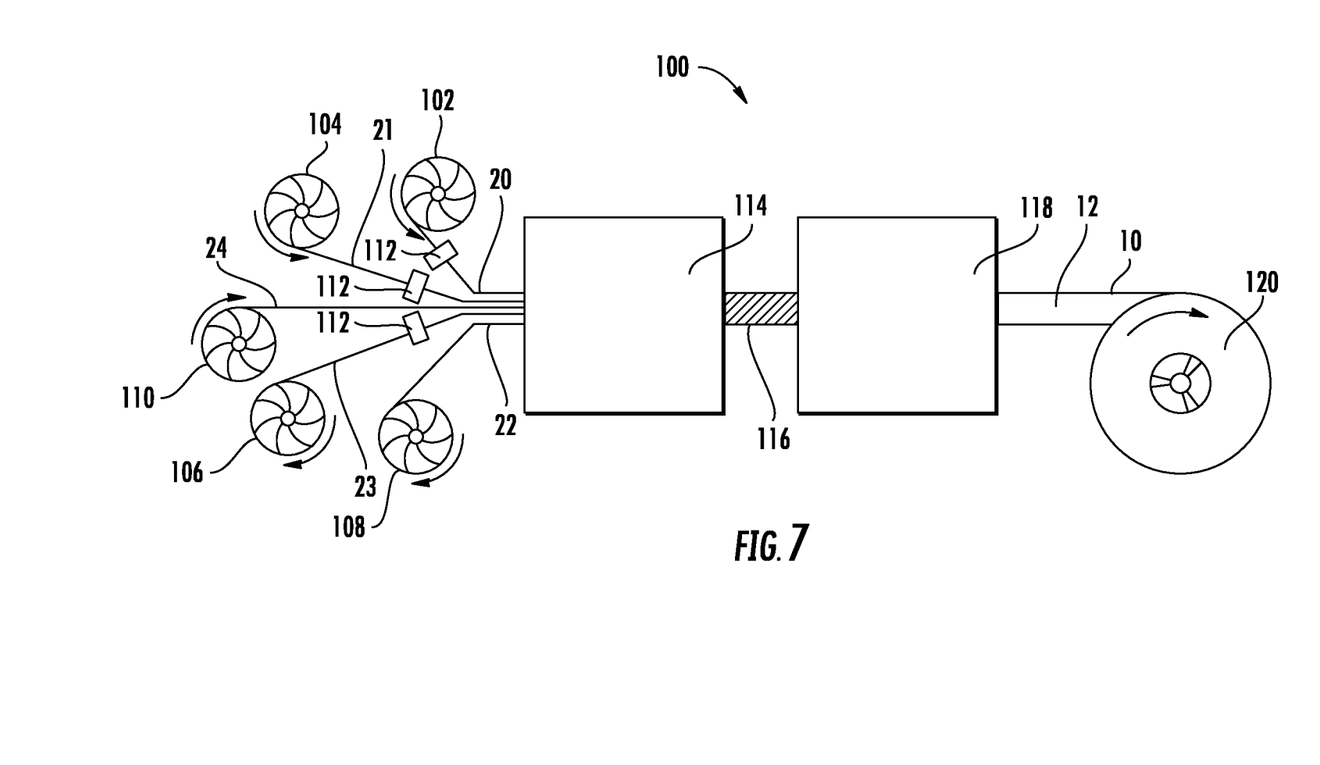
FIG. 7 is a schematic view showing a system and process for forming an optical cable according to an exemplary embodiment.

Referring to FIG. 7, a schematic view of a process and system 100 for forming an optical cable having core elements with surface-deposited colorant materials, such as cable 10, is shown according to an exemplary embodiment. After formation of buffer tubes 20, 21 and 23 around fibers 18, buffer tubes 20, 21 and 23 may be stored in storage locations 102, 104, 106, such as reels, spools, pans, buckets, boxes, etc. In various embodiments, buffer tubes 20, 21 and 23 are extruded around fibers 18, and then are cooled prior to storage in the storage locations. Once cooled buffer tubes 20, 21 and 23 may be stored prior to cable formation. In addition, one or more filler tube 22 may be stored in a storage location 108, and a central strength member 24 may be stored in a storage location 110.

To produce a cable, such as cable 10, buffer tubes 20, 21 and 23 are received from storage locations 102, 104 and 106 and are advanced through coloring stations 112. Coloring stations 112 deposit the different colorant materials on to the outer surfaces of buffer tubes 20, 21 and 23, respectively. As discussed above, coloring stations 112 may be a wide variety of ink application systems and/or dye application stations. Coloring station 112 may include more than one unit or applicator to form multiple stripes as shown in FIG. 3. In addition, coloring stations 112 may also include an additional applicator (e.g., a print head) that forms identification indicia, such as indicia 50 or 70 discussed above. In one embodiment, to form a helical stripe, such as stripe 61, color station 112 may rotate the respective buffer tube below a fixed applicator. For example in one embodiment, color station 112 is a stationary coloring station having a fixed applicator and the buffer tubes are rotated in an SZ rotating pattern relative to the color station. In another embodiment, color station 112 includes an applicator that rotates around the respective buffer tube to form a helical stripe.

Following, immediately or after some delay (e.g., hour, day, week), the application of the surface-deposited colorant material by coloring stations 112, buffer tubes 20, 21 and 23 move into stranding station 114. Stranding station 114 couples buffer tubes 20, 21 and 23 together along with any filler tubes 22 and central strength element 24. In one embodiment, buffer tubes 20, 21 and 23 and filler tubes 22 are coupled around strength element 24 in a pattern 116, such as a helical pattern or in a reversing helical pattern, such as an SZ stranding pattern. Following coupling together, the components of cable 10 are passed into one or more additional stations 118 to add any additional interior components, such as binder 26, water blocker 28, armor 30, etc., and to then apply jacket 12 around the interior components. In various embodiments, jacket 12 is an extruded medium density polyethylene that is formed around the interior components of cable 10. Following jacket extrusion, cable 10 may then be stored in a storage location 120.

In various embodiments, the buffer tubes discussed herein are formed from an extruded polypropylene material, and in these embodiments, the ink or dye used to form the surface-deposited color layers are configured to be compatible with (e.g., bond to) polypropylene. In other embodiments, the buffer tubes discussed herein are formed from a variety of extruded polymer materials including polypropylene, polyethylene or polyolefin co-polymers, polycarbonate material, polybutylene terephthalate (PBT), polyamide (PA), polyoxymethylene (POM), poly(ethene-co-tetrafluoroethene) (ETFE), or combinations of any of the polymer materials discussed herein, etc. In these embodiments, the ink or dye used to form surface-deposited color layers are configured to be compatible with (e.g., bond to) polycarbonate. In other embodiments, other suitable materials used in optical cable construction may be used to form the buffer tubes discussed herein. In other embodiments, the buffer tubes are surface treated via a number of methods including plasma discharge, chemical cleaning/etching, etc. to enhance the bond strength with the ink or dye.

In various embodiments, cable jacket 12 may be a variety of materials used in cable manufacturing such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

While the specific cable embodiments discussed herein and shown in the figures relate primarily to cables and core elements that have a substantially circular cross-sectional shape defining substantially cylindrical internal lumens, in other embodiments, the cables and core elements discussed herein may have any number of cross-section shapes. For example, in various embodiments, cable jacket 12 and/or the buffer tubes may have a square, rectangular, triangular or other polygonal cross-sectional shape. In such embodiments, the passage or lumen of the cable or buffer tube may be the same shape or different shape than the shape of cable jacket 12 or buffer tube. In some embodiments, cable jacket 12 and/or buffer tube may define more than one channel or passage. In such embodiments, the multiple channels may be of the same size and shape as each other or may each have different sizes or shapes.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The coatings of the optical fibers may include colorants (e.g., 12-color scheme) and may further include indicia, such as stripes.

In some contemplated embodiments, the same surface deposition teachings disclosed herein, such as dying, for core elements such as buffer tubes, may be used with a cable jacket, such as jacket 12, and the dye or ink may be used to carry UV-blocking additives, bonding agent additives (e.g., maleic anhydride), zirconates, titanates, aluminates, and other additives in addition to or as an alternative to colorants. The dye or ink may be evenly and uniformly applied to the entire exterior surface of the jacket 12, such as by passing the jacket 12 through a dye bath or by ink-jet printing. Dying, such as via bath, may be cheaper, easier to apply, and/or more permanent than ink-based surface deposition, such as due to the infusion of dye into the material of the cable jacket 12. In some such embodiments the dye is black-colored or orange-colored (or any of the dye colorants disclosed herein), such as to have the cable appear to have conventional jacket coloring, while when viewed in cross-section the color of the exterior may not extend fully through the thickness of the jacket, in contrast to many conventional jackets. The cable jacket, including the exterior, may be an integral, cohesive, uniform body having generally isotropic material properties, in contrast to multi-layer jackets and/or jackets with "skin" layers of many conventional jackets. The uniformity of the material properties of the jacket may improve cable performance, such as providing improved flexibility and robustness. In some embodiments, the colorant and/or other additives carried by dye extends deep enough into the jacket to permanently adhere to the jacket and/or to provide sufficient depth for ultra-violet light blocking additives, such as at least 10 micrometers, at least 100 micrometers, at least 150 micrometers, and/or less than all the way through the thickness of the jacket 12, such as less than half the thickness of the jacket 12, such as less than even a quarter of the thickness of the jacket 12. In some embodiments, the jacket 12 is primarily formed from "natural" polymer, recycled polymer, or other un-colored polymer, such as natural polyethylene or polyvinyl chloride, having a base color that may be relatively dull or pale, and the surface-deposited material may be used for coloring and/or UV-blocking on the exterior of the jacket. The difference in color of the dye or ink relative to the color of the jacket may match those differences described herein for the core element base materials and stripes thereon, such as quantified in terms of the Munsell system. Such a cable jacket may be more cohesive and/or more flexible than many conventional jackets, while saving colorant materials and/or UV-blocking materials.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. For example, in contemplated embodiments some or all of the buffer tubes of a cable and/or the jacket may be dyed, as disclosed herein, along the entire exterior surface, fully around the exterior, to fully cover with colorants and/or other dye disclosed herein the exterior of the jacket or buffer tube, such as buffer tubes 20, 21, and 23. In a particular cable, some of the buffer tubes may be fully colored, with others striped, or all may be fully colored with each buffer tube having a different dyed exterior color. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of forming an optical cable comprising:
    providing an extruded and cooled first buffer tube surrounding an optical fiber, wherein the first buffer tube is formed from a material having a first color;
    depositing a first colorant material to the outer surface of the extruded and cooled first buffer tube forming a colored area on the outer surface of the first buffer tube that extends axially along the outer surface of the first buffer tube, the first colorant material having a second color;
    providing an extruded and cooled second buffer tube surrounding an optical fiber, wherein the second buffer tube is formed from the material having the first color;
    depositing a second colorant material to the outer surface of the extruded and cooled second buffer tube forming a colored area on the outer surface of the second buffer tube that extends axially along the outer surface of the second buffer tube, the second colorant material having a third color; and
    coupling the first buffer tube and the second buffer tube together after the first colorant material is deposited and after the second colorant material is deposited.

2. The method of claim 1, wherein first colorant material extends into the first buffer tube to between 0.1% and 10% of a radial thickness of the first buffer tube, wherein second colorant material extends into the second buffer tube to between 0.1% and 10% of a radial thickness of the second buffer tube.

3. The method of claim 1, wherein the color area of the first buffer tube has a circumferential dimension that is between 40 degrees and 70 degrees of the circumference of the first buffer tube, wherein the color area of the second buffer tube has a circumferential dimension that is between 40 degrees and 70 degrees of the circumference of the second buffer tube.

4. The method of claim 1, wherein the color area of the first buffer tube extends around the entire circumference of the first buffer tube and the color area of the second buffer tube extends around the entire circumference of the second buffer tube.

5. The method of claim 1, wherein the first color has a Munsell Color System chroma number less than 2, and the second color and the third color have a Munsell Color System chroma number greater than 4.

6. The method of claim 5, wherein the first color has a Munsell Color System value number greater than 8.75, and the second color and the third color have a Munsell Color system value number less than or equal to 8.

7. The method of claim 1 wherein the coupling step includes coupling the first buffer tube and the second buffer tube to a central strength member in a SZ stranding pattern.

8. The method of claim 1 wherein the steps of depositing the first colorant material and depositing the second colorant material include at least one of ink-jet printing and dyeing.

9. The method of claim 1, further comprising a step of treating the outer surface of the first and second buffer tubes physically or chemically to enhance efficiency of the respective depositing steps.

* * * * *